US011617240B2

(12) United States Patent
Gambato et al.

(10) Patent No.: US 11,617,240 B2
(45) Date of Patent: Mar. 28, 2023

(54) MICROWAVE HEATING DEVICE AND METHOD FOR OPERATING A MICROWAVE HEATING DEVICE

(71) Applicant: ILLINOIS TOOL WORKS INC., Glenview, IL (US)

(72) Inventors: Francesco Gambato, San Giorgio in Bosco (IT); Marco Bullo, Scorzé (IT); Chiara De Massari, Costermano (IT); Nicola Lanza, Chioggia (IT); Fabrizio Dughiero, Padua (IT); Andrea Baccara, Paris (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 753 days.

(21) Appl. No.: 16/443,095

(22) Filed: Jun. 17, 2019

(65) Prior Publication Data

US 2019/0306937 A1    Oct. 3, 2019

Related U.S. Application Data

(63) Continuation of application No. 15/414,075, filed on Jan. 24, 2017, now Pat. No. 10,327,289.
(Continued)

(51) Int. Cl.
*H05B 6/72* (2006.01)
*H05B 6/68* (2006.01)
(Continued)

(52) U.S. Cl.
CPC ............. *H05B 6/72* (2013.01); *H05B 1/0263* (2013.01); *H05B 6/68* (2013.01); *H05B 6/705* (2013.01); *Y02B 40/00* (2013.01)

(58) Field of Classification Search
CPC ........ H05B 1/0263; H05B 6/68; H05B 6/705; H05B 6/72; Y02B 40/00
(Continued)

(56) References Cited

U.S. PATENT DOCUMENTS

| 4,196,332 A | 4/1980 | Mackay et al. |
| 2011/0168699 A1 | 7/2011 | Oomori et al. |

(Continued)

FOREIGN PATENT DOCUMENTS

| CN | 101502170 A | 8/2009 |
| CN | 101828427 A | 9/2010 |

(Continued)

OTHER PUBLICATIONS

International Search Report and Written Opinion of PCT/US2017/024934 dated Jul. 12, 2017, all enclosed pages cited.

*Primary Examiner* — Quang T Van
(74) *Attorney, Agent, or Firm* — Burr & Forman, LLP (57) ABSTRACT

A microwave heating device includes radiating portions adapted to radiate microwaves to the heating chamber and is operated according to operational configurations that differ in frequency or in phase shift(s) between the radiated microwaves. A learning procedure is executed by sequentially operating the radiating portions in several operational configurations. Energy efficiency data are calculated for those operational configurations. An operating frequency is selected based on energy efficiency data. An operational configuration with a maximum energy efficiency at the selected operating frequency is taken as a reference. A heating procedure is executed by sequentially operating the radiating portions in operational configurations having the selected operating frequency and respective phase shift(s) chosen around the respective phase shift(s) of the reference operational configuration. The phase shift(s) of each chosen operational configuration may have a phase shift distance (Continued)

from the respective phase shift(s) of the reference operational configuration, such that, in the space of the phase shifts, the reference operational configuration is surrounded by the chosen operational configurations.

20 Claims, 5 Drawing Sheets

Related U.S. Application Data (60) Provisional application No. 62/317,077, filed on Apr. 1, 2016.

(51) Int. Cl.
*H05B 6/70* (2006.01)
*H05B 1/02* (2006.01)

(58) Field of Classification Search
USPC ....... 219/748, 490, 678, 690, 702, 709, 750, 219/756, 761, 746, 716, 745, 747, 749; 426/129, 232, 641, 643, 644, 645
See application file for complete search history.

(56) References Cited

U.S. PATENT DOCUMENTS

| | | | |
|---|---|---|---|
| 2012/0103972 A1* | 5/2012 | Okajima | H05B 6/686 219/490 |
| 2013/0146590 A1* | 6/2013 | Einziger | B01J 19/126 219/709 |
| 2013/0313250 A1 | 11/2013 | Ibragimov et al. | |
| 2014/0287100 A1 | 9/2014 | Libman | |
| 2017/0290105 A1 | 10/2017 | Gambato et al. | |

FOREIGN PATENT DOCUMENTS

| | | |
|---|---|---|
| CN | 102273317 A | 12/2011 |
| CN | 102428751 A | 4/2012 |
| CN | 102474924 A | 5/2012 |
| CN | 102484908 A | 5/2012 |
| CN | 102484910 A | 5/2012 |
| CN | 102934518 A | 2/2013 |
| CN | 104350810 A | 2/2015 |
| CN | 105357788 A | 2/2016 |
| EP | 2475221 A1 | 7/2012 |
| EP | 2528415 A2 | 11/2012 |
| WO | 2011058537 A1 | 5/2011 |
| WO | 2014006510 A2 | 1/2014 |

* cited by examiner

MICROWAVE HEATING DEVICE AND METHOD FOR OPERATING A MICROWAVE HEATING DEVICE

CROSS-REFERENCE TO RELATED APPLICATIONS

This application is a continuation of U.S. application Ser. No. 15/414,075 filed Jan. 24, 2017, which claims priority to U.S. provisional application No. 62/317,077 filed Apr. 1, 2016, the entire contents of each of which are hereby incorporated by reference in their entirety.

TECHNICAL FIELD

This disclosure relates in general to the field of electromagnetic heating. Specifically, this disclosure relates to a microwave heating device and a method for operating a microwave heating device, in particular for thawing and/or cooking food products.

BACKGROUND

At present there are many known and widely-used techniques for heating a food product, both for thawing and for cooking.

According to some known heating techniques, the food product receives heat through its outer surface, which exchanges heat with an external heating element or with an external environment which is at a higher temperature. In these techniques, the flow of heat inside the food product is determined by the temperature gradient and by thermal diffusivity of the food product itself.

According to other known heating techniques, heat is generated directly inside the food product by means of electromagnetic fields or electromagnetic radiations. Amongst these, some techniques use radio frequency (RF) dielectric heating and other techniques use microwaves (MW). Conventionally, radio frequency electromagnetic waves lie within the band of frequencies between 1 and 300 MHz, whilst microwaves lie within the band of frequencies between 300 MHz and 300 GHz. In particular, radio frequency heating devices and microwave heating devices are known and widely utilized.

Electromagnetic heating techniques that use radio frequency or microwaves are generally useful for achieving shorter thawing or cooking times than techniques.

TECHNICAL FIELD

This disclosure relates in general to the field of electromagnetic heating. Specifically, this disclosure relates to a microwave heating device and a method for operating a microwave heating device, in particular for thawing and/or cooking food products.

BACKGROUND

At present there are many known and widely-used techniques for heating a food product, both for thawing and for cooking.

According to some known heating techniques, the food product receives heat through its outer surface, which exchanges heat with an external heating element or with an external environment which is at a higher temperature. In these techniques, the flow of heat inside the food product is determined by the temperature gradient and by thermal diffusivity of the food product itself.

According to other known heating techniques, heat is generated directly inside the food product by means of electromagnetic fields or electromagnetic radiations. Amongst these, some techniques use radio frequency (RF) dielectric heating and other techniques use microwaves (MW). Conventionally, radio frequency electromagnetic waves lie within the band of frequencies between 1 and 300 MHz, whilst microwaves lie within the band of frequencies between 300 MHz and 300 GHz. In particular, radio frequency heating devices and microwave heating devices are known and widely utilized.

Electromagnetic heating techniques that use radio frequency or microwaves are generally useful for achieving shorter thawing or cooking times than techniques that use heat exchange through the surface of the food product. However, a problem common to many known electromagnetic heating techniques relates to the difficulty of obtaining a sufficiently homogeneous distribution of the temperature inside the food product.

Moreover, another problem of known electromagnetic heating techniques is encountered when several identical loads (or portions) of a food product are simultaneously heated. In these cases, it often occurs that the temperatures of the loads are not similar to each other at the end of the heating procedure, i.e., it is not possible to obtain an acceptable spatial uniformity of heating.

These problems normally seem to be more significant for microwave heating devices.

Therefore, it would be desirable to have available a heating technique, in particular using microwaves, which allows a reduction in the non-uniformity of temperature distribution in the food product and/or among loads of food product during heating thereof.

BRIEF SUMMARY OF SOME EXAMPLE EMBODIMENTS OF THE SUBJECT OF THE PRESENT DISCLOSURE

Specifically, this disclosure relates to a heating device and a method that use a microwave heating technique to heat at least one product. In particular modes of use, the at least one product is a food product and heating is intended to thaw and/or to cook and/or to merely heat the food product. However, the heating device and the method may also be utilized for other types of products.

In some example embodiments, the microwave heating device may comprise a heating chamber for receiving at least one product to be heated, a microwave generating system including at least two radiating portions adapted to radiate microwaves to the heating chamber, a control unit. The microwave generating system may generate and radiate, via the at least two radiating portions, respective microwaves having a same frequency and different phases. Therefore, one of the radiating portions may be taken as a reference radiating portion and the microwaves of the other radiating portion (or the other radiating portions, if the radiating portions are more than two) may have respective phase shift (or phase shifts) from the microwaves of the reference radiating portion. An operational configuration of the microwave generating system may be defined by the frequency value and the phase shift value (or values).

In some example embodiments, the microwave generating system may comprise four radiating portions. Consequently, each operational configuration may be defined by a frequency value and three phase shift values. The phase combinations of the operational configurations may be represented as points in a three-dimensional space of phase shifts.

The control unit may be configured to operate the microwave generating system and to change the frequency and the phase shift (or phase shifts) of the microwaves radiated by the microwave generating system. Thus, the at least two radiating portions can be operated according to a plurality of operational configurations that differ from one another in frequency and/or in phase shift (or phase shifts) between the radiated microwaves. An energy efficiency, which is inversely related to a ratio of reflected power over radiated power, is associated with each operational configuration. The microwave heating device may include a reflected power detecting system and the control unit may be configured to calculate that energy efficiency.

According to an aspect of the present disclosure, the control unit may be configured to operate the microwave generating system in such a way that a "stirring" of microwave distribution inside the heating chamber can be obtained during a heating procedure for the at least one product. That aim may be achieved by sequentially operating the microwave generating system in several operational configurations, each one having a selected operating frequency and respective phase shift(s) that are chosen around the corresponding phase shift(s) of a reference operational configuration. In other words, a virtual stirring may be generated by a phase rotation method.

As a matter of fact, a change of phase shifts of the microwaves emitted by the radiating portions would entail a change of interference patterns of microwaves inside the heating chamber and, in particular, a shift of constructive and destructive interference positions. Thus, the positions which receive peaks of radiated power may be moved over the to-be-heated product, or over several portions of the product, by using several operational configurations with different phase shifts. That is useful for creating a more even spatial distribution of electromagnetic heating power inside the heating chamber and for achieving an improved spatial uniformity for the electromagnetic energy given to the product or to several loads of product during the heating procedure.

One aspect of the present disclosure relates to the choice of the operational configurations that will be used in the heating procedure.

According to some possible methods of use, data of energy efficiency as a function of operational configurations may be obtained for the product or several loads positioned in the heating chamber. The obtained data may be processed by the control unit so that an operating frequency and a reference operational configuration are selected, the reference operational configuration being the operational configuration with the maximum energy efficiency at the selected operating frequency. Moreover, the operational configurations for the heating procedure may be chosen as operational configurations having the selected operating frequency and respective phase shift(s) that is/are chosen around the corresponding phase shift(s) of the reference operational configuration. To be more specific, the phase shift(s) of each chosen operational configuration may have a phase shift distance from the respective phase shift(s) of the reference operational configuration, in such a way that, in the space of the phase shifts, the reference operational configuration is surrounded by the chosen operational configurations.

The present inventors have experimentally verified that the use of operational configurations chosen according to the methods here described can reach a favorable spatial uniformity of heating, in particular when a plurality of identical loads are simultaneously heated.

It should be considered that, for each frequency, the energy efficiency generally has a rather smooth trend between the minimum value and the maximum value, when the operational configuration is changed. Thus, these methods for choosing the operational configurations for the heating procedure can be useful for stirring the microwave distribution without creating any marked difference between the energy efficiencies of the operational configurations used in the heating procedure. This goes in favor of spatial uniformity of heating.

In some example embodiments, the microwave generating system may comprise four radiating portions and, therefore, each operational configuration may be defined by a frequency value and three phase shift values. The operational configurations may be represented as points in the three-dimensional space of the phase shifts. According to one possible method of use, the points of the operational configurations chosen for the heating procedure may be vertices of a polyhedron in the three-dimensional space of the phase shifts and the reference operational configuration may be an inner point or a central point of said polyhedron. In one specific method of use, the chosen operational configurations are eight and their corresponding points are vertices of a cube centered on the point of the reference operational configuration.

In other example embodiments, the microwave generating system may comprise N radiating portions and, therefore, each operational configuration may be defined by a frequency value and (N−1) phase shift values. According to one possible method of use, the points of the operational configurations chosen for the heating procedure may be vertices of a hyper-polyhedron in the (N−1)-dimensional space of the phase shifts and the reference operational configuration may be an inner point or a central point of said hyper-polyhedron, which in particular is a hypercube.

According to some possible methods of use, the phase shift distance may be calculated as a function of the efficiency difference at the selected operating frequency. The efficiency difference is defined as the difference between the maximum energy efficiency and the minimum energy efficiency that can be found for the operational configurations at a same frequency. To be more specific, the phase shift distance may be calculated as inversely related to the efficiency difference.

According to some possible methods of use, the operating frequency for the heating procedure may be selected as the frequency value for which the efficiency difference has the lowest value.

In some example embodiments, the control unit may be configured to obtain energy efficiency data by running a learning procedure, after the at least one product has been positioned inside the heating chamber. During the learning procedure, frequency and phase shift(s) are changed to sequentially operate the at least two radiating portions in several operational configurations. For each frequency, a number of operational configurations differing in phase shift(s) from one another may be chosen and the at least two radiating portions may be operated in those chosen configurations. To be more specific, during the learning procedure the frequency is changed over a range and, for each frequency, a number of operational configurations differing in phase shift(s) from one another are chosen.

The energy efficiency may be calculated for each of said several operational configurations for the learning procedure and the obtained data of energy efficiency may be saved. In this way, data of energy efficiency as a function of operational configurations can be obtained for the at least one product in the heating chamber.

That is useful for directly obtaining information about how much the at least one product in the heating chamber interacts with microwaves and how such an interaction varies when frequency and/or phase shifts are changed. As a matter of fact, each product introduced in the heating chamber has features that differ from other products. Moreover, the interaction with the microwaves depends on the shape of the product and its position in the heating chamber.

In particular, the learning procedure may allow mapping of energy efficiency, as a function of frequency and phase shifts, for a specific group of identical loads to be heated simultaneously. The learning procedure is useful for best setting the operational configurations for that group of identical loads in the heating chamber. The short duration of the learning procedure does not influence the whole cooking process and the learning procedure may be repeated from time to time without any problem during cooking.

In other words, the learning procedure may implement an adaptive algorithm that allows adaptation of the heating procedure to the specific group of loads to be heated. The data obtained in the learning procedure may be used to choose the operational configurations for the heating procedure: during the heating procedure, the at least two radiating portions are sequentially operated according to the operational configurations that have been chosen on the basis of the data obtained in the learning procedure.

In other example embodiments, energy efficiency data may be already available to the control unit for that specific load or group of loads to be heated, without the need of a learning procedure. For example, those data could have been obtained for an identical load or group of loads during a previous learning procedure and were saved, so that the control unit may retrieve them when heating of an identical load or group of loads is required. In another example, those data could have been obtained and processed in a set-up phase for the microwave heating device and saved as a specific recipe for that particular load or group of loads. Thus, the operations of obtaining and processing energy efficiency data may be carried out only once for each load or group of loads and a specific recipe may be recalled for cooking a corresponding load or group of loads. These example embodiments may be suitable for particular types of loads that should be placed in certain fixed positions in the heating chamber of the microwave heating device. That may be useful in businesses such as fast food shops, where the range of products to be cooked is very limited and the loads of product, which can be placed always in the same positions in the heating chamber, are standardized in terms of quantity, shape and size.

BRIEF DESCRIPTION OF THE DRAWINGS

Having herein described the subject of this disclosure in general terms, further features and methods of use will become apparent in the following detailed description of some example embodiments, provided by way of example and without limiting the scope of the disclosure. Reference will be made to the appended figures, which are schematic drawings not necessarily to scale, in which.

DETAILED DESCRIPTION OF EXAMPLE EMBODIMENTS

Figure 1:
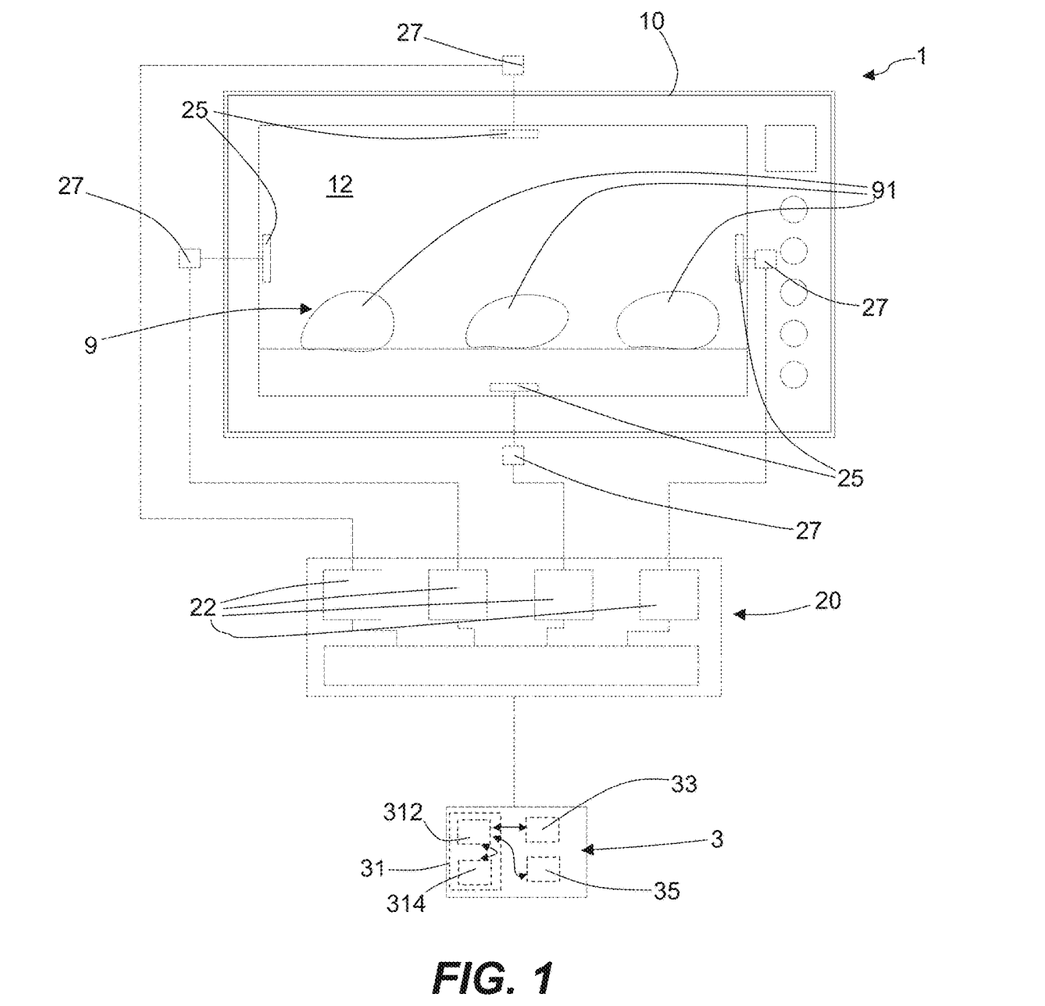
FIG. 1 is a schematic view of an example embodiment of a microwave heating device according to this disclosure, some components thereof being simply depicted as block elements.

An example embodiment of a microwave heating device according to this disclosure is labelled with the numeral 1 and is schematically illustrated in FIG. 1.

FIG. 1 shows several components of the heating device 1 in order to make this description easier to understand. Some components in dashed lines are shown outside a structure of the heating device 1 merely to allow a functional representation thereof. However, the figure should not be taken to be a precise and detailed technical drawing to be used for production purposes. Therefore, FIG. 1 does not show all of the components of the heating device 1 and shall not be considered to be a drawing in which the scale and proportions between the parts are faithfully reproduced.

The microwave heating device 1 may be used for heating at least one product 9, in particular at least one food product, e.g., a food, a dish, a piece of meat, a vegetable product. According to some modes of use, the microwave heating device 1 may be used for simultaneously heating several loads or portions of a product 9. Three loads of a food product are shown by way of example in FIG. 1 and are labelled 91. In the present description, any reference to "food product 9" should be understood as also referring to several loads 91 of product to be simultaneously heated.

According to some modes of use, the food product 9 to be heated may be a frozen (or deep-frozen) food product and the heating device 1 can be used to thaw such a frozen food product 9. According to other modes of use, the device 1 may be used to cook the food product 9.

The device 1 comprises a supporting structure 10, which for example comprises a box-shaped casing and/or a framework that supports the other components of the device 1. The device 1 also comprises a heating chamber 12 which is designed to receive the at least one food product 9 (in particular, the loads 91) to be heated. For example, the heating chamber 12 is located inside the supporting structure 10. The device 1 may comprise a door (not shown) that may alternatively be opened to allow access to the heating chamber 12 and closed to perform heating of the food product 9 in the closed heating chamber 12.

The device 1 comprises a control unit 3 and a microwave generating system 20 which includes at least two radiating portions 25. In the example embodiment in FIG. 1, the microwave generating system 20 comprises four of said radiating portions 25. In other example embodiments, the radiating portions 25 may be two, three or more than four.

The at least two radiating portions 25 are facing the heating chamber 12. The microwave generating system 20 is designed to generate microwaves and the at least two radiating portions 25 are adapted to radiate microwaves to the heating chamber 12.

In some embodiments, the microwave generation may be made by solid-state generators. To be more specific, the microwave generating system 20 comprises solid-state power amplifiers 22, each of them being connected with a respective radiating portion 25. The power amplifiers 22 may be controlled independently from one another, for example by the control unit 3, so that the signal generated by each of them may be controlled in terms of frequency, phase and amplitude. The generated signal is received by the respective radiating portion 25 to radiate a corresponding microwave. Thus, the microwaves radiated by the radiating portions 25 can be changed in frequency, phase and/or power.

The working range for microwave frequency may be between 300 MHz and 300 GHz. In particular, in some example embodiments the working range for microwave frequency may be between 2400 MHz and 2500 MHz. In some embodiments, the working range for microwave phases may be between 0° and 360°. In some embodiments, a maximum value for power provided by each power amplifier 22 may be 200 W. Obviously, lower or higher power values are possible in other example embodiments.

In some embodiments, the microwave generating system 20 may be designed to generate and radiate, via the at least two radiating portions, respective microwaves that have a same frequency and different phases.

In one example embodiment having two radiating portions, the two radiated microwaves may have phases that are different from each other. Thus, one radiating portion may be taken as a reference radiating portion and the microwaves radiated by the other radiating portion can have a phase shift from the microwaves radiated by the reference radiating portion.

In other example embodiments having more than two radiating portions, the radiated microwaves may have phases that are different from one another. Thus, one radiating portion may be taken as a reference radiating portion and the microwaves radiated by each of the other radiating portions can have a respective phase shift from the microwaves radiated by the reference radiating portion. In the specific example embodiment of FIG. 1 having four radiating portions 25, three phase shifts are defined.

The frequency value and the phase shift value (or values) identify or define an operational configuration of the microwave generating system 20. In other words, an operational configuration is a combination of frequency and phases that the microwave generating system 20 can be operated with. In the specific example embodiment with four radiating portions 25, each operational configuration is defined by a frequency value and three phase shift values.

In addition to the operational configuration defined by frequency and phases, the operative conditions of the microwave generating system 20 include also the power level at which the radiating portions 25 are set.

The control unit 3 may be configured to operate the microwave generating system 20 and to change the frequency and the phase shift(s) of the microwaves generated by the microwave generating system 20. In other words, the control unit 3 may be configured to set a plurality of operational configurations, according to which the microwave generating system 20 can be operated. Moreover, the control unit 3 may adjust the power level of each radiating portion 25. In particular, the radiating portions 25 may be operated with a same power level, i.e., the microwaves radiated by them may have all a same power.

During use of the microwave heating device 1, a radiated power is associated with the microwaves radiated by the radiating portions 25 and the radiated power is partially absorbed by the to-be-heated food product 9 located inside the heating chamber 12. An absorbed share of the radiated power is converted into heat in the food product 9, whereas a remaining share of the radiated power is reflected by the heating chamber 12.

In some embodiments, the microwave heating device 1 comprises a reflected power detecting system, which is configured to detect the share of radiated power that is reflected by the heating chamber 12. To be more specific, the reflected power detecting system may comprise a plurality of detectors 27, one for each radiating portion 25. Each detector 27 may be adapted to detect the microwave power that is returned back to the respective radiating portion 25 by the heating chamber 12.

For example, each detector 27 may be an electric-power detector that is positioned between a power amplifier 22 and the respective radiating portion 25. Moreover, radiated power (or forward power) may be detected or measured for each radiating portion 25. For example, the reflected power detecting system and radiated power detectors may be included in electronic circuitry of the microwave heating device 1.

In some embodiments, the control unit 3 may be connected with the reflected power detecting system (and also with the radiated power detectors) and may be configured to calculate an energy efficiency that is inversely related to a ratio of reflected power over radiated power. For example, radiated power ($P_{rad}$) may be calculated as a sum of individual powers radiated by the radiating portions 25; reflected power ($P_{ref}$) may be calculated as a sum of individual reflected powers detected by the detectors 27. Energy efficiency (Eff), in percentage, may be calculated as follows: $Eff = (1 - P_{ref}/P_{rad}) * 100$.

The control unit 3 may be configured to calculate an energy efficiency value for each operational configuration of the microwave generating system 20.

Figure 2:
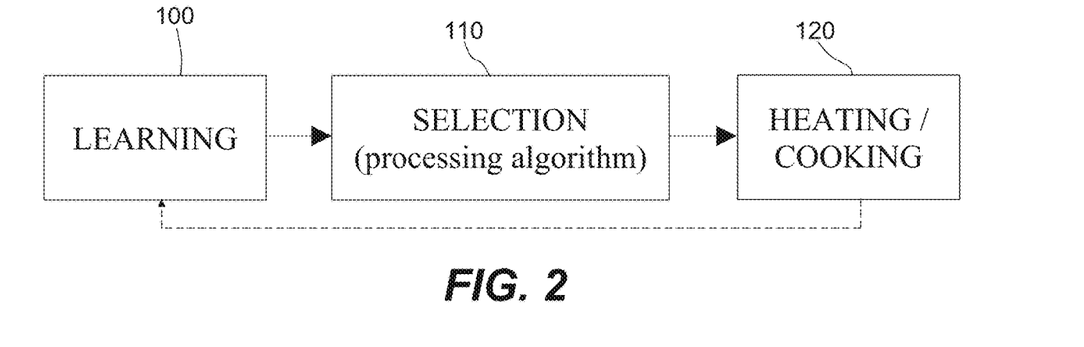
FIG. 2 is a block diagram of a possible method of use of a microwave heating device according to this disclosure.

As schematically shown in FIG. 2, a learning procedure 100, which is intended to "understand" the food product 9, may be executed before a heating procedure 120, which is intended to heat and/or cook the food product 9. A selection procedure 110 may be executed after the learning procedure 100 and before the heating or cooking procedure 120, in order to select the operational conditions for the subsequent heating procedure 120 on the basis of the results obtained in the learning procedure 100. The control unit 3 may be configured to run those procedures.

According to some methods of use, the learning procedure 100 may have a basic function of evaluating how the food product 9 in the heating chamber 12 interacts with microwaves, in order to allow a favorable setting of the parameters of the microwave generating system 20, that setting being tailored to the specific food product 9. In other words, the learning procedure 100 may be an inspection that aims at testing the food product 9 and identifying the best heating conditions for the food product 9 in the heating chamber 12. It should be noticed that the learning procedure 100 should be executed while the to-be-heated food product 9 is inside the heating chamber 12. Therefore, the food product 9 should be positioned in the heating chamber 12 before starting the learning procedure 100.

Basically, the learning procedure 100 may include applying to the food product 9 microwaves according to a plurality of different operational configurations, by sequentially operating the radiating portions 25 with different phases and different frequencies (but at the same time with the same frequency for all radiating portions 25).

During the learning procedure 100, the control unit 3 may operate the microwave generating system 20 with frequency and phase shift (or shifts) that are changed over respective ranges and the energy efficiency may be calculated for each of the corresponding operational configurations. In other words, a number of configurations are sequentially analyzed and energy efficiency is calculated for each configuration.

For example, frequency may be changed over a range between 2400 MHz and 2500 MHz, with a frequency step of 10 MHz. In other embodiments, frequency may be changed over the range between 300 MHz and 300 GHz. For each frequency, a number of combinations of phases may be chosen by changing phase shift (or shifts) over a respective phase range with a phase step. To be more specific, the phase range is an interval between 0° and 360° and the phase step may be constant over the interval. For example, the phase step is 45°. It should be taken into account that a phase shift of 0° is equivalent to a phase shift of 360°, then the corresponding operational configurations are to be considered only once.

Figure 3:
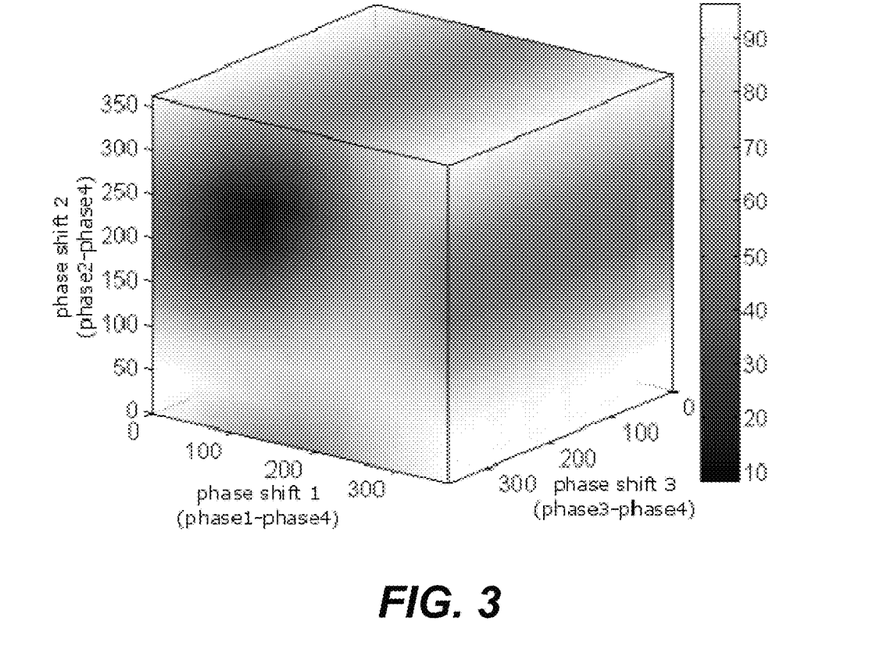
FIG. 3 is an exemplary graph relating to a possible method of use for a microwave heating device according to this disclosure.

The obtained data of energy efficiency for the chosen operational configurations may be electronically saved in order to allow a subsequent processing. For example, data are saved as a data matrix containing all the chosen operational configurations and the corresponding energy efficiency values. For example, FIG. 3 shows a three-dimensional space in which energy efficiency is mapped in greyscale as a function of three phase shifts.

Figure 5:
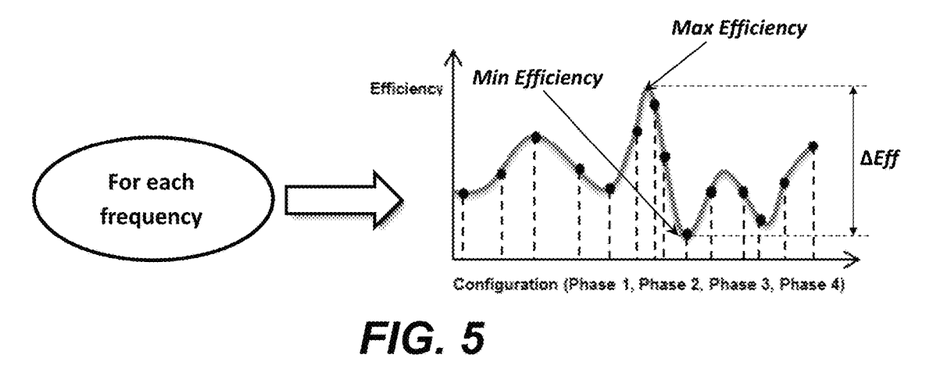
FIG. 5 is a schematic diagram of a step of the selection procedure of FIG. 4.

Moreover, thanks to the learning procedure 100, for each frequency a graph of the trend of energy efficiency depending on the configurations (i.e., on the phases or phase shifts) may be obtained, as shown in FIG. 5. The graphs of FIGS. 3 and 5 are specific for the food product 9 in the heating chamber 12 and also depend on the technical features of the microwave heating device 1.

In particular, the control unit 3 may be configured to operate the microwave generating system 20 in the chosen operational configurations, to calculate the energy efficiency for each of the chosen operational configurations and to save the obtained data into an electronic data storage. In possible methods of use, the data obtained in the learning procedure 100 may be filtered in order to discard any operational configuration not complying with one or more additional requirements, so the operational configurations for the following selection procedure 110 may be less than the operational configurations for the learning procedure 100.

According to one method of use, the obtained data may be processed in the selection procedure 110, via a processing algorithm, to choose a plurality of operational configurations that can be used for heating the food product 9.

According to one aspect of the present disclosure, the selection procedure 110 may basically be as follows: an operating frequency is selected, a reference operational configuration at the operating frequency is selected, and a plurality of operational configurations are chosen around the reference operational configuration.

Figure 4:
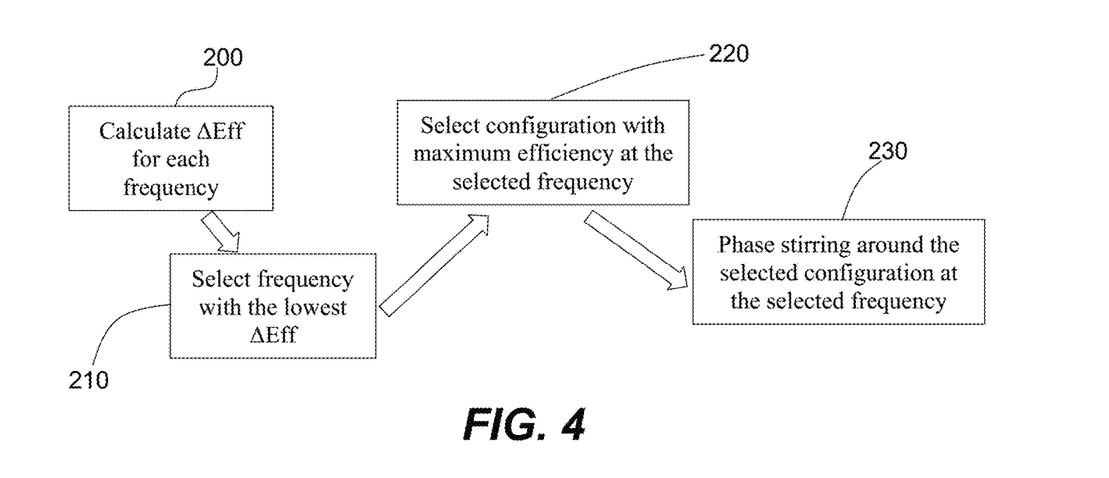
FIG. 4 is a block diagram of a possible algorithm of a selection procedure according to this disclosure.

One possible processing algorithm for selection of the operating frequency is described, in connection with the block diagram of FIG. 4. For each frequency in the obtained data, at operation 200 the energy efficiency data may be analyzed to single out an operational configuration with a maximum energy efficiency and an operational configuration with a minimum energy efficiency. An efficiency difference (ΔEff) may be calculated as the difference between the maximum energy efficiency (Max Efficiency) and the minimum energy efficiency (Min Efficiency), at the same frequency (see also FIG. 5). The operating frequency may be selected as the frequency value that minimizes the efficiency difference, at operation 210. Thus, when running the algorithm, the control unit 3 is configured to select the operating frequency that corresponds with the lowest difference between maximum energy efficiency and minimum energy efficiency (see FIG. 6).

Other processing algorithms may be adopted for selection of the operating frequency. For example, standard deviation and/or maximum energy efficiency at the same frequency of efficiency difference may be taken into account, defining a mathematical function that depends on frequency. The operating frequency may be selected by minimizing or maximizing that mathematical function.

After selection of the operating frequency at operation 210, the reference operational configuration may be selected at operation 220 as the operational configuration with the maximum energy efficiency at the selected operating frequency. Also this selection may be made on the basis of the data obtained in the learning procedure 100.

At operation 230, the plurality of operational configurations for the heating procedure 120 may be chosen all with the selected operating frequency, but with phase shifts that are chosen around the respective phase shifts of the reference operational configuration. Thus, the operational configurations chosen for the heating procedure 120 may have the same frequency and differ from one another in at least one phase shift.

In particular, the phase shifts of each chosen operational configuration may have a phase shift distance from the respective phase shifts of the reference operational configuration, such that, in the space of the phase shifts, the reference operational configuration is surrounded by the chosen operational configurations. Therefore, the heating procedure 120 may follow a phase stirring method around the reference operational configuration.

In other words, the absolute value of the difference between each phase shift of any chosen operational configuration and the corresponding phase shift of the reference operational configuration may be equal to a preset value, which is the phase shift distance.

Figure 7:
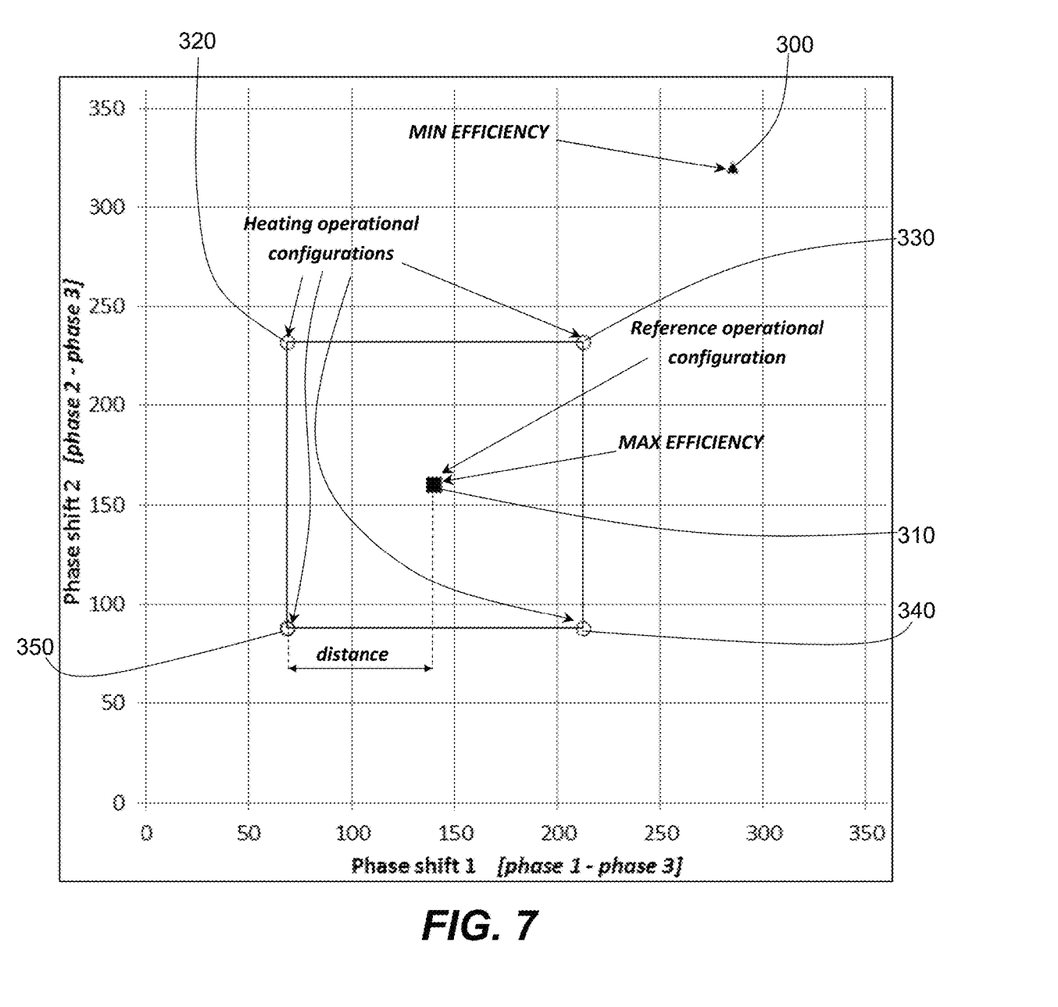
FIG. 7 is an exemplary graph relating to a heating procedure of a possible method of use of an example embodiment of a microwave heating device according to this disclosure.

For example, FIG. 7 refers to a microwave heating device having a microwave generating system 20 that includes three radiating portions 25. Thus, each operational configuration can be defined by a frequency value and two phase shift values, which for example are calculated as differences of the phases of first and second radiating portions from the phase of the third radiating portion.

The operational configurations correspond with points in the two-dimensional space of the phase shifts. The operational configurations chosen for the heating procedure correspond with points (labelled with the numerals 320, 330, 340, 350) that can be vertices of a polygon in that two-dimensional space, the reference operational configuration corresponds with an inner point (in particular a central point, labelled with the numeral 310) of said polygon. FIG. 7 shows that the reference operational configuration 310 is surrounded by the operational configurations 320, 330, 340, 350 for the heating procedure 120. In the specific example, the chosen operational configurations 320, 330, 340, 350 are four and may correspond with vertices of a square, whereas the reference operational configuration 310 may correspond with the center of the square. The configuration with the minimum energy efficiency at the selected operating frequency is shown as well and is labelled with the numeral 300.

Figure 8:
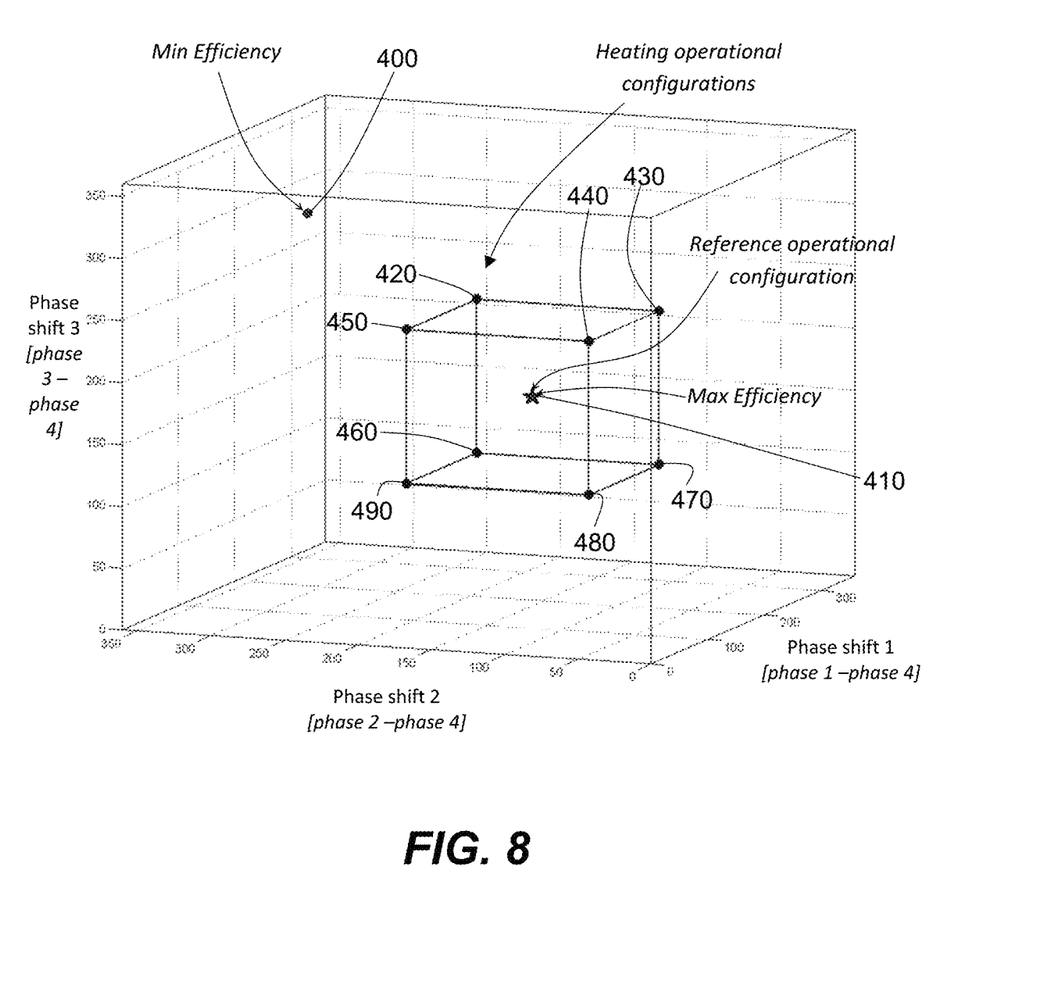
FIG. 8 is an exemplary graph relating to a heating procedure of a possible method of use of another example embodiment of a microwave heating device according to this disclosure.

According to another example, FIG. 8 refers to a microwave heating device having a microwave generating system 20 that includes four radiating portions 25. Thus, each operational configuration can be defined by a frequency value and three phase shift values, which for example are calculated as differences of the phases of first, second and third radiating portions from the phase of the fourth radiating portion.

The operational configurations correspond with points in the three-dimensional space of the phase shifts. The operational configurations chosen for the heating procedure 120 correspond with points (labelled with the numerals 420, 430, 440, 450, 460, 470, 480, 490) that can be vertices of a polyhedron in that three-dimensional space, the reference operational configuration corresponds with an inner point (in particular a central point, labelled with the numeral 410) of said polyhedron. FIG. 8 shows that the reference operational configuration 410 is surrounded by the operational configurations 420, 430, 440, 450, 460, 470, 480, 490 for the heating procedure 120. In the specific example, the chosen operational configurations 420, 430, 440, 450, 460, 470, 480, 490 are eight and may correspond with vertices of a cube, whereas the reference operational configuration 410 may correspond with the center of the cube. The configuration with the minimum energy efficiency at the selected operating frequency is shown as well and is labelled with the numeral 400.

That aspect can be generalized to a microwave heating device having a microwave generating system 20 that includes any number N of radiating portions 25, N being two or more. In this case, each operational configuration can be defined by a frequency value and N−1 phase shift values. The operational configurations correspond with points in the (N−1)-dimensional space of the phase shifts. The operational configuration chosen for the heating procedure 120 may correspond with points that can be vertices of a hyper-polyhedron in the (N−1)-dimensional space of the phase shifts and the reference operational configuration may correspond with an inner point (in particular, a central point) of said hyper-polyhedron. In particular, the chosen operational configurations may be $2^{N-1}$ and the hyper-polyhedron may be a hypercube. The reference operational configuration may correspond with the center of the hypercube.

According to one mode for choosing the operational configurations for the heating procedure 120, the phase shifts of each of them can be calculated as follows:

$$\text{phase\_shift}_i = \text{ref\_phase\_shift}_i \pm \text{phase\_dist}_i,$$

where $\text{phase\_shift}_i$ is the $i^{th}$ phase shift of the operational configuration, $\text{ref\_phase\_shift}_i$ is the $i^{th}$ phase shift of the reference operational configuration, $\text{phase\_dist}_i$ is the phase shift distance chosen for the $i^{th}$ phase shift. All the possible combinations of phase shift values can be considered to create the set of operational configurations for the heating procedure 120.

In order to obtain a square, a cube or a hypercube, $\text{phase\_dist}_i$ have the same value for all the phase shifts.

In some embodiments, the control unit 3 may be configured to calculate the phase shift distance as a function of the efficiency difference for the selected operating frequency, in such a way that the phase shift distance is inversely related to the efficiency difference. A lower efficiency difference would entail a higher phase shift distance and wider phase stirring around the reference configuration, whereas a larger efficiency difference would entail a lower phase shift distance and a narrower phase stirring.

According to some specific algorithms, the phase shift distance (in degrees) may be calculated as the difference between 90 degrees and the efficiency difference (as a difference of efficiencies in percentage) at the selected operating frequency: phase_dist=90°−ΔEff.

Figure 6:
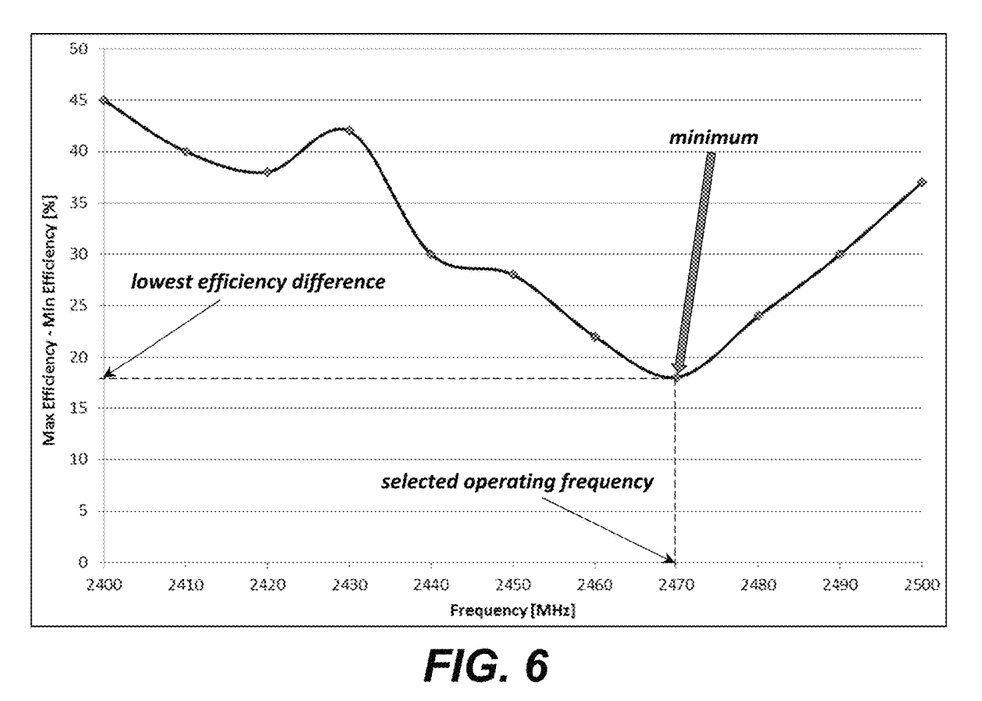
FIG. 6 is an exemplary graph relating to the selection procedure of FIG. 4.

An example of a selection procedure 110 is here described in connection with FIGS. 6 and 7. The lowest efficiency difference, resulting from a learning procedure 100 applied to a specific product 9 or a group of loads 91, is found at a frequency of 2470 MHz, which may be selected as operating frequency for the heating procedure 120. The efficiency difference at that frequency is 18%, thus the phase shift distance is: 90−18=72 degrees. For example, FIG. 7 refers to a heating device 1 with three radiating portions 25, for which two phase shifts can be defined. The maximum efficiency difference for the selected frequency of 2470 MHz is found at $\text{phase\_shift}_1$ of 140 degrees and $\text{phase\_shift}_2$ of 160 degrees. Those values represent the reference operational configuration ($\text{ref\_phase\_shift}_1$; $\text{ref\_phase\_shift}_2$). Thus, $\text{phase\_shift}_1$ of the heating operational configurations is selected at 68 degrees (i.e., 140−72) or 212 degrees (i.e., 140+72), $\text{phase\_shift}_2$ of the heating operational configurations is selected at 88 degrees (i.e., 160−72) or 232 degrees (i.e., 160+72). Consequently, the phase shift values of the operational configurations for the heating procedure 120 are: (68; 232); (212; 232); (212; 88); (68; 88).

After said plurality of operational configurations have been chosen in the selection procedure 110, the at least two radiating portions 25 may be sequentially operated in said plurality of operational configurations during the heating procedure 120. According to some modes of use, during the heating procedure 120 each of the selected operational configurations may be applied for a same time, i.e., the overall heating time may be equally divided among the selected operational configurations.

According to some embodiments, the control unit 3 may be configured to operate the microwave generating system 20 with an adjustable power that is changed between the learning procedure 100 and the heating procedure 120. In particular, the radiated power in the learning procedure 100 may be lower than the radiated power in the heating procedure 120. In other words, during the learning procedure 100 the heating chamber 12 may be fed with microwaves having very low power (e.g., an overall power of 20 W), i.e., the power amplifiers 22 may be operated with reduced power (e.g., 5 W each). That may be useful for avoiding a significant heating or cooking of the food product 9 during the learning procedure 100. The learning procedure 100 may last a few seconds, which is a negligible time in comparison with an entire cooking time of several minutes. During the heating procedure 120 the heating chamber 12 may be fed with microwaves having high power, for example the power amplifiers 22 may be operated with power of 200 W.

In other embodiments or modes of use, avoiding a significant heating or cooking during the learning procedure 100 is not an issue. In some cases, for example, heating during the learning procedure 100 may be useful for reducing overall cooking time. Thus, in those cases the learning procedure 100 may be executed with power as high as in the heating procedure 120.

In some methods of use, the heating procedure 120 may be suspended at least one time to repeat the learning procedure 100, so that the heating procedure 120 may be continued with updated operational configurations. In other words, the learning procedure 100 and the heating procedure 120 are alternately repeated more times for the same product 9 in the heating chamber 12, each heating procedure 120 being based on the data obtained in the preceding learning procedure 100 and processed in a selection procedure 110. That is useful for adapting the heating procedure 120 to the changing physical characteristics of the food product 9 during heating or cooking.

As already mentioned, the control unit 3 may be configured to run the learning procedure 100, the selection procedure 110 and the heating procedure 120. In order to carry out those tasks, the control unit 3 may include processing circuitry 31 that may be configured to interface with, control or otherwise coordinate the operations of various components or modules described herein in connection with executing control over such component or modules as described herein. The control unit 3 may utilize the processing circuitry 31 to provide electronic control inputs to one or more functional units of the microwave generating system 20 and/or of the reflected power detecting system, to receive, transmit and/or process data associated with the one or more functional units and perform communications necessary to enable the ability to control operations of the microwave generating system 20 and/or of the reflected power detecting system (or components thereof) as described herein.

In some embodiments, the processing circuitry 31 may be embodied as a chip or chip set. In other words, the processing circuitry 31 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 31 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 31 may include one or more instances of a processor 312 and memory 314 (e.g., volatile or non-volatile memory) that may be in communication with or otherwise control a device interface 33 and a user interface 35. As such, the processing circuitry 31 may be embodied as a circuit chip (e.g., an integrated circuit chip) configured (e.g., with hardware, software or a combination of hardware and software) to perform operations described herein.

The device interface 33 may include one or more interface mechanisms for enabling communication with other devices. In some cases, the device interface 33 may be any means such as a device or circuitry embodied in either hardware, or a combination of hardware and software that is configured to receive and/or transmit data from/to devices or components (e.g., system components) in communication with the processing circuitry 31 via internal and/or external communication mechanisms. Accordingly, for example, the device interface 33 may further include devices and/or means for receiving data from the microwave generating system 20 and/or the reflected power detecting system and/or one or more sensors.

The subject matter of this disclosure may be modified and adapted in several ways without thereby departing from the scope of this disclosure. All details of the invention may be substituted with other technically equivalent elements and the materials used, as well as the shapes and dimensions of the various components, may vary according to requirements. It is therefore evident that the example embodiments described above are non-limiting and that other embodiments are possible, still being covered by the appended claims. Moreover, although the description and the drawings describe examples of combinations of elements and functions, it is evident that embodiments are possible that have different combinations of elements and functions, which in any case are covered by the teaching of this disclosure.

It should also be noticed that the advantages and benefits mentioned with reference to the example embodiments described above do not necessarily have to be present in all of the possible embodiments that are covered by the teaching of this disclosure. The specific terms used in the description are used with a generic and descriptive meaning, not with a limiting purpose.

The invention claimed is:

1. A microwave heating device comprising:
a heating chamber configured to receive a food product to be heated;
a microwave generating system configured to generate microwaves and including at least two radiating portions that are adapted to radiate microwaves to the heating chamber, a radiated power being associated with the radiated microwaves and, in use, a share of radiated power being reflected in the heating chamber; and
a control unit,
wherein the microwave generating system is configured to radiate, via the at least two radiating portions, respective microwaves having a same frequency and different phases such that each set of a given frequency and corresponding different phases represents an operational configuration,
wherein the control unit is configured to scan a plurality of frequencies and generate a matrix of operational configurations and an energy efficiency value for each one of the operational configurations, the energy efficiency being inversely related to a ratio of reflected power over radiated power for the each one of the operational configurations, and
wherein the control unit is configured to perform a selection procedure to determine a strategy for heating the food product based on the matrix.

2. The microwave heating device of claim 1, wherein the selection procedure comprises determining an operating frequency, determining a reference operational configuration as an operational configuration with a maximum energy efficiency at the operating frequency, and determining a plurality of selected operational configurations based on a difference metric relative to the reference operational configuration.

3. The microwave heating device of claim 2, wherein the difference metric comprises a measure of phase shift difference relative to respective phase shifts of the reference operational configuration.

4. The microwave heating device of claim 3, wherein the selected operational configurations surround the reference operational configuration in phase shift space.

5. The microwave heating device of claim 2, wherein determining the operating frequency comprises determining, for each frequency in the matrix, a standard deviation between a maximum efficiency and a minimum efficiency, and selecting the operating frequency as a frequency value at which the standard deviation is minimized or maximized.

6. The microwave heating device of claim 2, wherein determining the operating frequency comprises determining, for each frequency in the matrix, an efficiency difference between a maximum efficiency and a minimum efficiency, and selecting the operating frequency as a frequency value at which the efficiency difference is minimized.

7. The microwave heating device of claim 2, wherein determining the operating frequency comprises determining, for each frequency in the matrix, a mathematical function based on a maximum efficiency and a minimum efficiency, and selecting the operating frequency as a frequency value at which the mathematical function is minimized or maximized.

8. The microwave heating device of claim 2, wherein the control unit is configured to run a heating procedure, in which the microwave generating system is sequentially operated in each of the selected operational configurations.

9. The microwave heating device of claim 1, wherein the selection procedure comprises determining an operating frequency, determining a reference operational configuration as an operational configuration with a maximum energy efficiency at the operating frequency, and performing a phase stirring procedure around the reference operational configuration.

10. The microwave heating device of claim 9, wherein the phase stirring procedure comprises determining a preset phase shift distance and altering phase shifts around the reference operational configuration by the present phase shift distance.

11. The microwave heating device of claim 9, wherein the control unit is configured to calculate a phase shift distance as a function of an efficiency difference that is the difference between a maximum energy efficiency and a minimum energy efficiency at the selected operating frequency, and wherein the phase shift distance is inversely related to the efficiency difference.

12. The microwave heating device of claim 1, further comprising graphing a trend of energy efficiency versus operational configuration to eliminate operational configurations that do not comply with a predetermined requirement.

13. A method for operating a microwave heating device, the microwave heating device comprising a heating chamber and at least two radiating portions that are adapted to radiate microwaves to the heating chamber, wherein the at least two radiating portions can be operated in a plurality of operational configurations that differ in frequency and/or in phase shift(s) between the radiated microwaves, the method comprising:

radiating, via the at least two radiating portions, respective microwaves having a same frequency and different phases such that each set of a given frequency and corresponding different phases represents an operational configuration, scanning a plurality of frequencies;

generating a matrix of operational configurations and an energy efficiency value for each one of the operational configurations, the energy efficiency being inversely related to a ratio of reflected power over radiated power for the each one of the operational configurations; and performing a selection procedure to determine a strategy for heating a food product in the heating chamber based on the matrix.

14. The method of claim 13, wherein the selection procedure comprises determining an operating frequency, determining a reference operational configuration as an operational configuration with a maximum energy efficiency at the operating frequency, and determining a plurality of selected operational configurations based on a difference metric relative to the reference operational configuration.

15. The method of claim 14, wherein the difference metric comprises a measure of phase shift difference relative to respective phase shifts of the reference operational configuration.

16. The method of claim 15, wherein the selected operational configurations surround the reference operational configuration in phase shift space.

17. The method of claim 14, wherein determining the operating frequency comprises determining, for each frequency in the matrix, an efficiency difference between a maximum efficiency and a minimum efficiency, and selecting the operating frequency as a frequency value at which the difference efficiency is minimized.

18. The method of claim 14, wherein determining the operating frequency comprises determining, for each frequency in the matrix, a mathematical function based on a maximum efficiency and a minimum efficiency, and selecting the operating frequency as a frequency value at which the mathematical function is minimized or maximized.

19. The method of claim 13, wherein the selection procedure comprises determining an operating frequency, determining a reference operational configuration as an operational configuration with a maximum energy efficiency at the operating frequency, and performing a phase stirring procedure around the reference operational configuration.

20. The method of claim 19, wherein the phase stirring procedure comprises determining a preset phase shift distance and altering phase shifts around the reference operational configuration by the present phase shift distance.

* * * * *